(12) United States Patent
Wang et al.

(10) Patent No.: US 8,762,431 B2
(45) Date of Patent: Jun. 24, 2014

(54) SYSTEM AND METHOD FOR SECURE ERASE IN COPY-ON-WRITE FILE SYSTEMS

(75) Inventors: Wenguang Wang, Santa Clara, CA (US); John Garvey, Victoria (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/351,859

(22) Filed: Jan. 17, 2012

(65) Prior Publication Data

US 2013/0185555 A1 Jul. 18, 2013

(51) Int. Cl.
*G06F 17/30* (2006.01)

(52) U.S. Cl.
USPC .......................................... 707/821; 711/154

(58) Field of Classification Search
CPC ..................... G06F 17/30067; G06F 17/30117
USPC ......................................................... 707/821
See application file for complete search history.

(56) References Cited

U.S. PATENT DOCUMENTS

| | | | |
|---|---|---|---|
| 6,731,447 B2 | 5/2004 | Bunker et al. | |
| 7,739,315 B2 | 6/2010 | Haga | |
| 7,831,560 B1 | 11/2010 | Spertus et al. | |
| 2009/0172265 A1* | 7/2009 | Park et al. | 711/103 |
| 2009/0319582 A1* | 12/2009 | Simek et al. | 707/204 |
| 2010/0138619 A1 | 6/2010 | Benavides | |
| 2010/0179941 A1 | 7/2010 | Agrawal et al. | |
| 2011/0154060 A1 | 6/2011 | Guyot et al. | |
| 2012/0254505 A1* | 10/2012 | Chishtie et al. | 711/103 |

FOREIGN PATENT DOCUMENTS

EP   1 349 088 A2   10/2003

OTHER PUBLICATIONS

PCT International Search Report and Written Opinion of International Application No. PCT/US2013/021443; mailed on Mar. 4, 2013 (10 pgs).
Rolf Hakenes, et al.; "A Novel Low-Power Microprocessor Architecture"; Proceedings 2000 International Conference on Computer Design. (ICCD). Austin, TX, Sep. 17-20, 2000; [International Conference on Computer Design], New York, NY; IEEE, US, Sep. 17, 2000, pp. 141-146 XP001089865; ISBN: 978-0-7803-6628-2.

* cited by examiner

*Primary Examiner* — Kannan Shanmugasundaram
*Assistant Examiner* — Kris Andersen
(74) *Attorney, Agent, or Firm* — Blakely, Sokoloff, Taylor & Zafman LLP

(57) ABSTRACT

Disclosed herein are systems, methods, and non-transitory computer-readable storage media for a delayed secure deletion of files from a copy-on-write file system. A system configured to practice the method receives a change to a file, writes a copy of the file in a first block of a storage device, the copy including the change, determines whether the change meets a predetermined condition, adds an entry into a delayed secure deletion list when the change triggers the predetermined condition, the entry storing an address associated with the first block, and deletes the first block when another change to the file is received, wherein the another change triggers another predetermined event.

22 Claims, 8 Drawing Sheets

SYSTEM AND METHOD FOR SECURE ERASE IN COPY-ON-WRITE FILE SYSTEMS

BACKGROUND

1. Technical Field

The present disclosure relates generally to securely erasing data and more specifically to techniques and systems for securely erasing data in copy-on-write file systems.

2. Introduction

Electronic devices capable of storing information generally include a storage device such as a hard drive. The programs and data stored on the storage device are based on a file management system. In some file management systems such as a copy-on-write file system, new copies of files storing programs and data are created and stored in blocks of the storage device whenever a change is made to the file. By storing multiple copies of the same file, the file management system can fall back on older versions of the file when problems arise with the current copy of the file, thus improving the robustness of the system in case of a system crash. For wearable storage devices such as solid state drives, writing a new copy of the file whenever changes are made helps dissipate wear evenly to blocks of the storage device, thus improving its longevity and reliability.

There are however disadvantages to this type of file management system. For instance, storing multiple copies of a file can make the file (and as a result, the electronic device) more prone to attack. As an example, an attacker can access a version of a file that the user has deleted by gaining access to older copies of the file.

Thus, there is a need for improved techniques to securely erase data in copy-on-write file systems.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for securely erasing or deleting data in copy-on-write file systems. The systems comprise of a storage device such as a hard disk that has been partitioned into two portions. The hard disk can be controlled by a file management system. A first portion is configured to store data in a copy-on-write fashion where a file is copied and written onto the storage device whenever a change is made to the file. Thus, more copies of a file will be generated on the storage device as the file changes over time.

Files that have special importance can be tracked and monitored. A file can have special importance if the file is used for storing user passwords, account information, decryption keys, keys for accessing information on other devices, or other valuable passcodes. Copies of an important file can be tracked and monitored using a delayed secure deletion list. When new copies of the important file are generated, an entry pointing to the storage location of the important file can be stored in the deletion list. Thus, the deletion list stores entries capable of tracking the whereabouts of important files. In order to maintain good performance, the deletion list can be periodically trimmed so that the number of entries in the deletion list is under a predefined number.

At a later time when it is determined that older versions of the file are a security risk, the copies of the file can be securely deleted. A security risk can occur when a file managing the access rights to data stored on the storage device has changed. This is because older versions of the file still exist on the storage device and if located, can still access data on the storage device according to the old permissions. Thus, these other copies of the file should be deleted. Deletion can be performed by iterating through the deletion list storing all copies of the file and securely erasing the copies of the file. Sometimes, the copies of the file do not need to be securely erased since they have already been repurposed and reused by the file management system.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
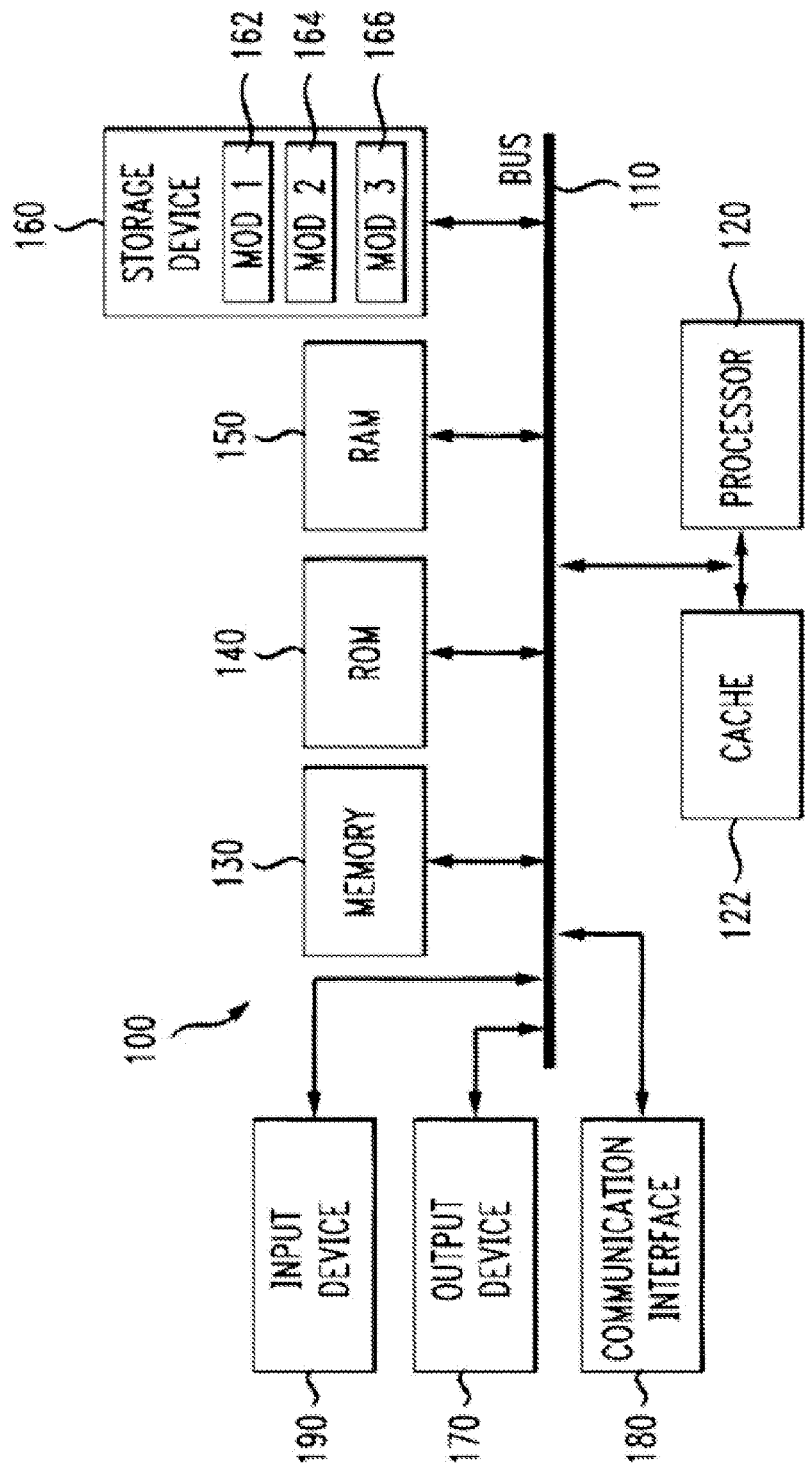
FIG. 1 illustrates an exemplary system embodiment.

The present disclosure addresses the need in the art for securely erasing data from a storage device implementing a copy-on-write file management system. By implementing a delayed secure deletion list in the file system, all older versions of a file can be deleted from the storage device at the same time as the current version, thus preventing attackers from gathering information from old versions of the data. This can be particularly important for files including sensitive data such as user passcodes, passphrases, answers to security questions, or financial information. A brief introductory description of a basic general purpose system or computing device, which can be employed to practice the concepts is illustrated in FIG. 1. A more detailed description of how the deletion of sensitive data occurs will follow. Several variations shall be discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, a solid state drive, a tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of techniques and systems for securely erasing data in a copy-on-write file system. A copy-on-write file system comprises of a storage device and a file management system. The file management system is capable of creating new copies of data (which can be a file, a part of a file, or metadata such as directories, properties, property lists) whenever the data is altered and storing the new copies of data in blocks of the storage device. While the examples and embodiments disclosed here discuss changes to files and the creation of new copies of files, it is to be understood that this is in no way limiting. For example, the examples and embodiments described are also applicable to changes to parts of a file, metadata associated with the file/file system, and other data that is not a single file. For example, a change to a part of a file can cause a new copy of that part to be created and stored. As another example, a change to metadata associated with the file system (such as directories or properties) can also result in the creation of new metadata that is stored in a block of the storage device.

A change to a file can be due to actions such as editing data in the file or changing the metadata of the file. For example if the file is associated with a user profile, a change to a parameter in the file such as a display icon used to identify the user can cause a new copy of the file to be generated and stored. In other examples, changes to files that are referenced in the current file can also cause a new copy of the current file to be generated and stored because pointers to references can change. Exemplary storage devices include a hard disk drive, flash memory, optical drive, solid state drive, and other storage mediums. The techniques set forth herein can improve the security of a file system by securely wiping older versions/copies of the file stored in one or more blocks of the storage device when the user desires to delete the most up to date file. The older copies of the file can be located using a delayed secure deletion list that contains data associated with copies of the file. The delayed secure deletion list can be updated whenever a new copy of the file is generated. These techniques can be applied to files of high importance such as files containing encryption keys to decrypt a user's secure data stored in the file system.

Figure 2:
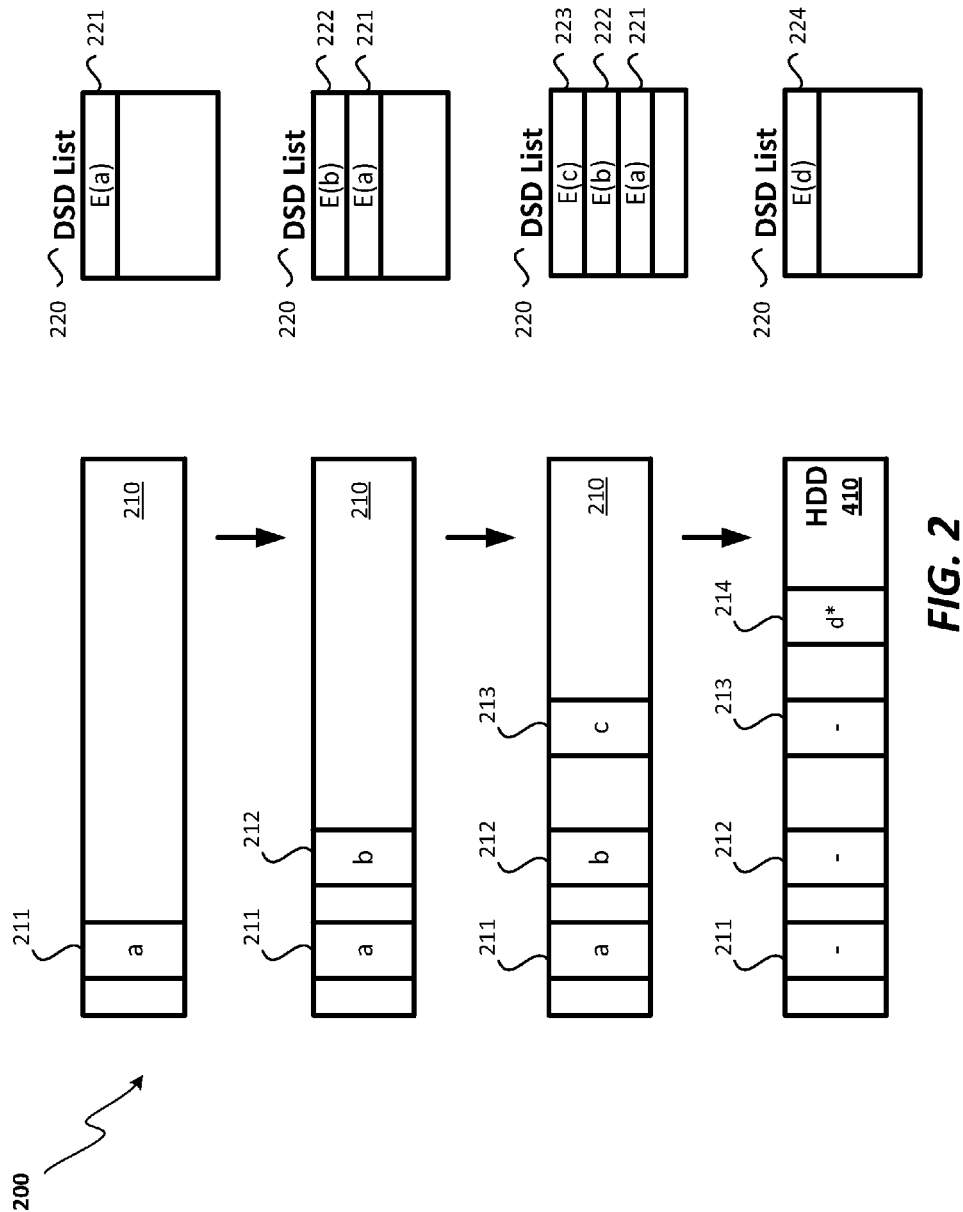
FIG. 2 illustrates an exemplary file system.

FIG. 2 illustrates an exemplary file system. The file system can be implemented on any storage device, such as a hard disk drive, solid state drive, magnetic disk drive, optical disk drive, solid state drive, tape drive or the like. Here, storage device 200 includes block array 210 and delayed secure deletion list ("DSD List") 220. Block array 210 is partitioned into multiple chunks or blocks with each block having a unique address. Each block is capable of storing an amount of data. In some examples, unique address of the block can be its logical address. In other examples, the block's address can be its physical address. Blocks can also store a virtual address. The virtual address is a pointer to an entry in a virtual address table. The virtual address table can be a table configured to map a virtual address to a logical address or physical address. In some examples, each virtual address can be associated with a file so that the virtual address table can map the file associated with the virtual address to the logical or physical address storing the most up to date version of that file. In one example, block array 210 is allocated and configured to store data related to profiles and passwords for users of an electronic device coupled to storage device 200. Thus, data stored in block array 210 can store user profiles and provide decryption keys to access content located in storage device 200. In some examples, the decryption key can be universal for all users with access to storage device 200. Thus, all users of the electronic device access and share the same DSD list. In other examples, the decryption keys provided can be user specific. User specific decryption keys can be used to decrypt data owned by a specific user or data owned by a number of specific users. In other words, a single decryption key would not be able to decrypt the data owned by all users. If the amount of data in the DSD list were to reach an amount that can cause problems related to performance or disk space, the DSD list can be split into multiple DSD lists. Each DSD list can be configured to store a specific type of sensitive information (e.g., only store decryption keys) or be configured for a limited set of users (or even a single user). This process can be automatically performed by the file management system or alternatively be configured by the user as an option of the file system. These smaller DSD lists can improve performance of the file management system by creating lists that are easier to manage and traverse.

As blocks of data are written into block array 210, entries can be generated in DSD List 220. An entry can be generated in DSD List 220 when the block being written contains sensitive data that the user or file system would like to securely erase in the future. Secure erasure means that once the current version of the data has been deleted, all previous versions are also deleted. The file system can accomplish this by iterating through the DSD list to locate other versions of the data present on storage device 200 and deleting those other versions, when necessary. In some examples, the DSD list is one or more blocks of storage device 200 that have been chained together. Depending on the number of entries supported in the DSD list, the number of blocks chained can vary. For example, if a block is capable of storing 300 entries, then a DSD list configured to support 600 entries would include two blocks chained together. The DSD list can be user-specific (i.e., monitoring private data for one user) or system-specific (i.e., monitoring private data for more than one user). In scenarios where the DSD list is system-specific, changes to one or more user portfolios can result in a new block and creation of a new entry in the DSD list.

Once block 211 is written to block array 210, an entry can be written in DSD List 220. The decision of whether to generate an entry can be based upon the data stored in the block. For example, entry 221 can be created if block 211 is marked as being a special block, such as a block containing sensitive data or containing information related to access rights of the system. In other examples, all blocks written in block array 210 are special blocks and thus no determination is needed. If an entry needs to be saved and a DSD list is not available, the list can be created. In this example, entry 221 is generated from block 211. Entry 221 can be associated with block 211, thus allowing entry 221 to locate block 211 in the future. In other words, entry 211 can serve as a pointer back to block 211. After block 211 is written, block 212 is also written into block array 210. This triggers the creation of entry 222, which is associated with block 212. Similarly, block 213 is also written in block array 210, which results in the generation of entry 223. As shown here, DSD list 220 can be a first in, first out list where new entries added to the list are placed on the top of the list. However, it is to be understood that other data structures can also be used with DSD list 220.

As blocks are written to block array 210, another determination can also be made as to whether writing the block triggers a predetermined event (or condition). If writing the block triggers the predetermined condition, the file system can execute a procedure to ensure that sensitive data is no longer stored in blocks associated with the entries in DSD list 220. This procedure can include reviewing the blocks associated with the entries and wiping or deleting the contents of the block, if necessary. In some examples, the predetermined event can be an event that would benefit from the deletion of sensitive data in the blocks associated with the entries in DSD list 220. For example, the predetermined event can be a change of a user password, the deletion of a user account, a change in permissions provided to a user account, adding a new user, or others including user defined events. In these situations, the access rights associated with the storage device have changed due to the predetermined event and thus, the file management system deletes older versions/copies of user data and access rights that may be stored in storage device

200. Doing so limits the available avenues for an attacker to gain access to the data and also ensures that access to the storage device is limited to the desired accessibility scheme. For example, an accessibility scheme can be a particular set of users each having access to selected files or the file system as a whole.

Here, storage device 200 receives a request to store block 214. Unlike blocks 211, 212 and 213, block 214 contains data that triggers the predetermined event. In response to triggering the predetermined event, the file management system iterates through DSD List 220 and erases any sensitive data from blocks 211, 212, and 213. This can include examining the blocks and erasing sensitive data such as passwords or other user-specified Entries 221, 222, and 223 can be removed from DSD List 220 since the blocks associated with those entries no longer contain sensitive data. In some examples, each entry can be removed after it has been processed by the file management system. Processing can include reviewing and potentially erasing the contents of the block associated with the entry. As a result of writing block 214, blocks 211, 212, and 213 have been cleared and entries 221, 222, and 223 have been removed from DSD List 220. Entry 224 can be added to DSD list 220 at some point in time (e.g., either before the iteration of the DSD list or after the iteration of the DSD list). In other examples, different criteria can be applied to determine when to add a written block to the DSD list and when to clear the data in blocks associated with the DSD list. For example, an entry pointing to a block can be added to the DSD list when a newer version of the block is written (rather than adding an entry whenever a block is written. These determinations can be performed at various times in the process such as before, during, or after the block is written.

In some embodiments, the file management system can be configured to periodically monitor or maintain the DSD list. Maintenance can include periodically trimming the DSD list such that the DSD list remains within storage limitations. The storage limitation may be defined by the number of storage blocks that have been assigned to the DSD list. For example, in a file system where a single block can store 200 entries from a DSD list, a DSD list comprised of two blocks chained together would be capable of storing approximately 400 entries. The DSD list can be monitored by the file management system to ensure that new entries do not overflow the list. Overflowing the list can cause another block to be added to DSD List 220 resulting in a performance loss from managing a longer list. Monitoring can include removing certain entries from the DSD list to make room for other, newer entries. An example of monitoring and maintaining a DSD list is described in FIG. 3 below.

Figure 3:
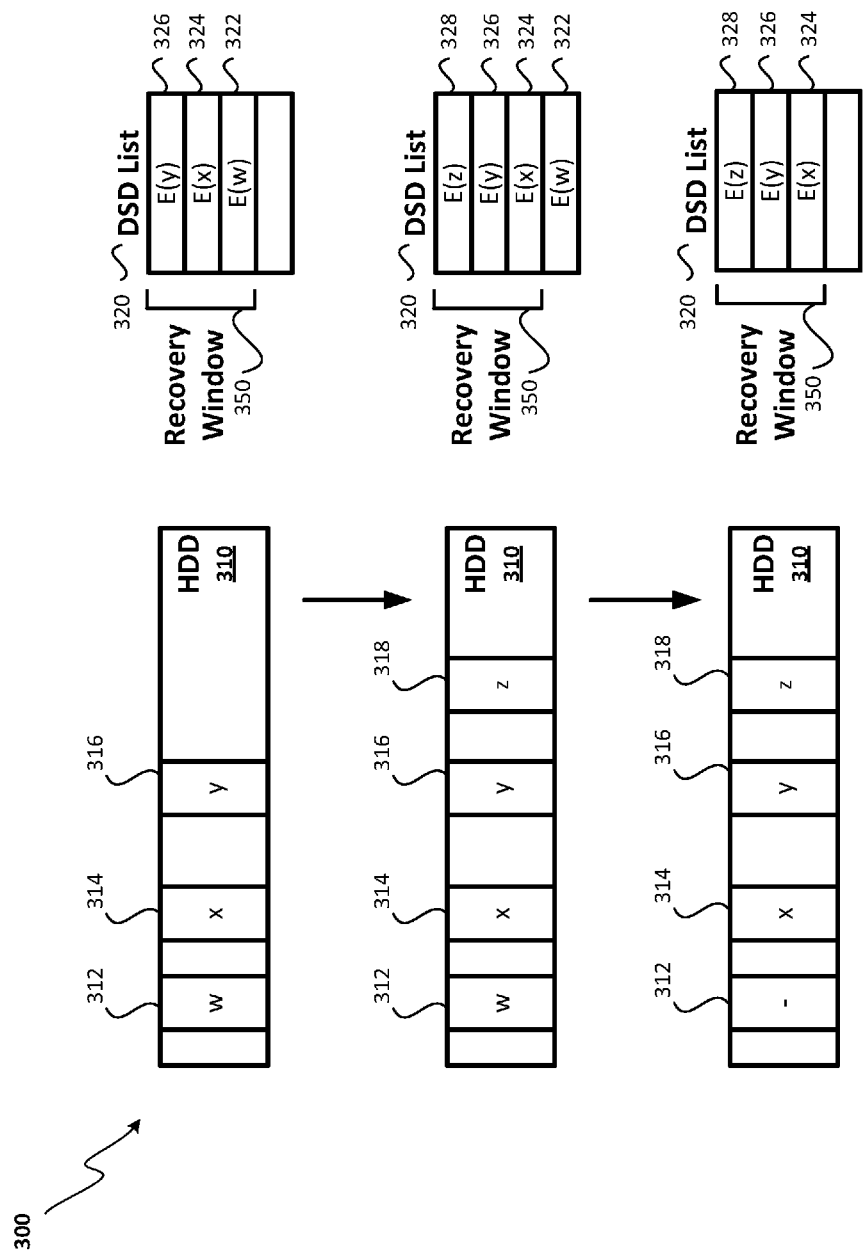
FIG. 3 illustrates another exemplary file system.

FIG. 3 illustrates another exemplary file system. Here, storage device 300 includes hard disk drive ("HDD") 310 and DSD List 320. HDD 310 can be a portion (or partition) of an entire hard disk drive, solid state disk drive, or other storage device described above. Alternatively, HDD 310 can be a stand-alone storage medium in storage device 300 that is configured to store data associated with access rights of the system. HDD 310 includes blocks 312, 314, and 316, all which contain sensitive data. As a result, entries corresponding to these blocks (e.g., entries 322, 324, and 326) are created in DSD List 320. DSD List 320 also includes an attribute defining recovery window 350. Recovery window 350 is defined by the system as a range of current and past versions of files where blocks falling within the recovery window cannot be touched (or reused) by the file management system even after they are freed. For example, a block storing an old version of a file cannot be reused by the file management system if the block is within the recovery window. While entries that fall outside of the recovery window can be stored within DSD list, the blocks are not guaranteed to remain untouched (e.g., blocks are eligible to be wiped if the space is needed). Thus, the recovery window is used by the system to support robust crash protection in cases of system failure. In some examples, the recovery window can simply be a window of the last 30 transactions executed by the file system. As shown, entries 322, 324, and 326 fit within recovery window 350.

Block 318 is subsequently added to HDD 310. Block 318 includes sensitive data and therefore entry 328 (which is associated with block 318) is added to DSD list 320. When a new entry is added to DSD list 320, the file management system can check and determine whether trimming DSD list 320 is required. Trimming can be required to prevent addition of another block to DSD List 320. Here, the addition of entry 328 expands DSD List 320 past recovery window 350. As a result, entry 322 is trimmed from the list. In some examples, trimming can include removing entry 322 from DSD List 320. Trimming can also include examining the block associated with entry 322 (e.g., block 312) to determine whether the block still contains sensitive data. Block 312 may not contain sensitive data at this time if block 312 has been reused by the file management system. Reuse of the block writes new data over the old data, thus removing the sensitive data from block 312. A determination of whether block 312 still contains sensitive data can be made based on the contents of block 312, the contents of DSD List 320, other data in the storage device, or a combination of the above. Here, entry 322 falls outside recovery window 350 and is trimmed, where trimming includes the deletion of block 312 (i.e., the block associated with entry 322). Deletion can include either writing zeroes in block 312 or alternatively, writing junk into block 312.

Figure 4:
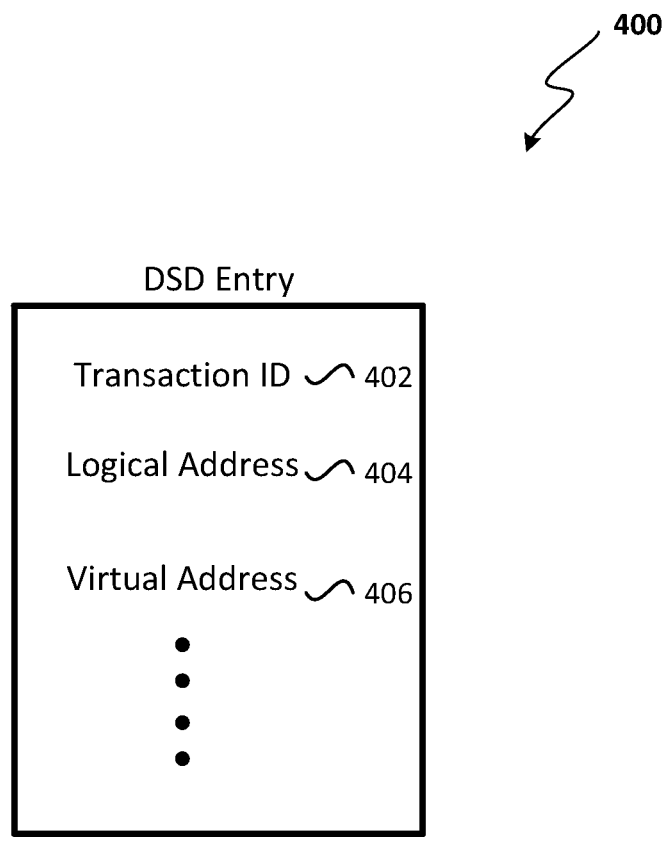
FIG. 4 illustrates an exemplary entry in a delayed secure deletion list.

FIG. 4 illustrates an exemplary entry in the DSD list. A DSD entry can store information associated with a particular block written to a storage device. The information can include metadata related to a block currently being written. For example, the block can be created for a block when the block is saved on the storage device. The information can include metadata related to a block that was previously written. For example, a DSD entry is created for an old version of a block when a new version of the block is created. The information associated with the block can include metadata about when the block was written to the storage device or metadata about the block's storage location on the storage device. In this example, DSD entry 400 includes transaction identifier 402, logical address 404, and virtual address 406. Each of these values can be set when adding DSD entry 400 to a DSD list. The transaction identifier 402 can be set to an identifier associated with the transaction (or command) executed by the file management system that resulted in the generation of the block associated with DSD entry 400. The file management system can use the transaction identifier to determine when the block was created or to determine when the block was created in comparison with other blocks written on the storage device. This can be useful for determining whether a block has fallen outside the recovery window. In some examples, the transaction identifier can also be useful for determining whether a block contains sensitive data. For example if a block storing a file has a transaction identifier in its header that is more recent than the transaction identifier stored in a DSD entry also associated with the file, a determination can be made that the block has been used in a subsequent transaction and therefore, sensitive data originally in the block has been overwritten. In this scenario, the file management system may decide that the block does not need to be wiped during secure deletion (i.e., clearing the DSD list).

DSD entry 400 can also include logical address 404. Logical address 404 can be an address describing the location of a block on the storage device. In some examples, the logical address can be an offset value for locating a block. Each logical address in the system points to a unique block on the storage device. Thus, logical address 404 can be used to specifically locate a block on the storage device that is associated with DSD entry 400. DSD entry 400 further includes virtual address 406. A virtual address can be mapped to a logical address by using a virtual address table. The virtual address table can associate a file with a particular virtual address and then map that virtual address to the logical address that is storing the current version of that file. Thus, the logical address stored in a DSD entry can change for each copy of the file that is written while the virtual address of those copies remains the same. In other words, the virtual address can be used to identify the file, regardless of its version. In other examples, other metadata can be stored in DSD entry 400. For example, a physical address can be also stored when a solid state drive is used as the storage device. A solid state drive can have its own memory management system and as a result, the physical address of where the file is stored can change as the file is moved around for reasons such as wear leveling (i.e., arranging data on the device so that erasures and re-writes are distributed evenly across the medium, thus minimizing premature failures due to a single block having a much higher write concentration than other blocks on the device). As a result, APIs can be used to provide the physical address of a file from the solid state drive up to the file management system for storage in the DSD entry. Changes to the physical address of the file can result in the generation of new DSD entries. This allows the file management system to locate all versions of the file on the solid state drive for deletion in the future. In yet other examples, other data can be stored in DSD entry 400.

Figure 5:
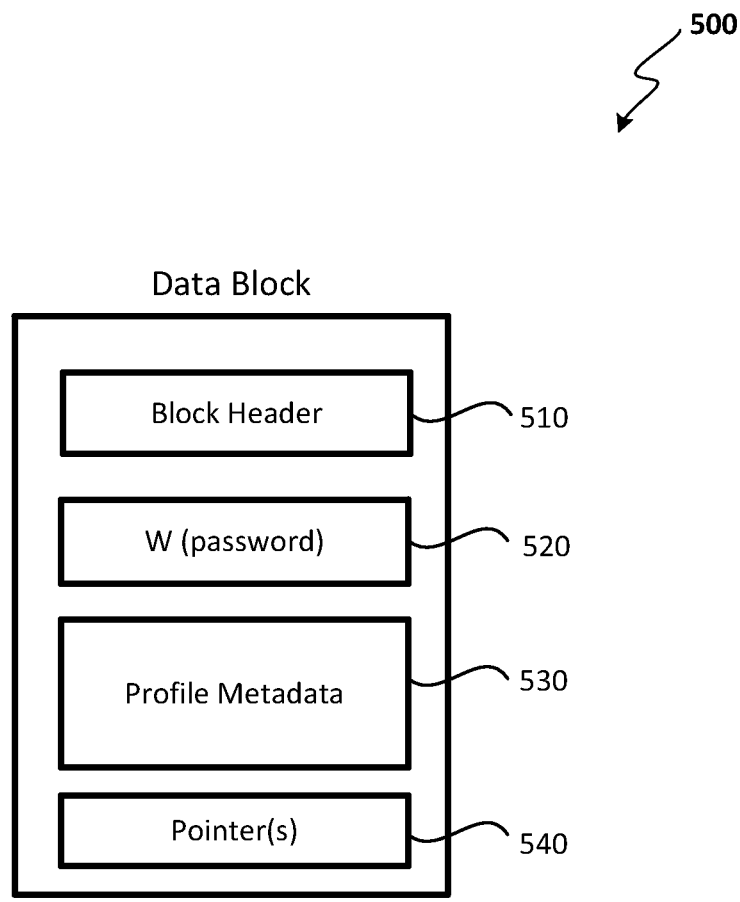
FIG. 5 illustrates an exemplary data block.

FIG. 5 illustrates an exemplary data block. A data block can be written onto a disk or other storage medium/device of the file management system. In some examples, the block can be configured to store sensitive user data such as keys for decrypting or encrypting (or both) data in a storage device, passwords of the user, and other information the user or system wishes to control access to. Here, data block 500 includes block header 510, password wrapper 520, profile metadata 530, and pointer(s) 540. Block header 510 can be configured to store metadata associated with the transaction that generated data block 500, the data being stored in block 500, and location on the disk that data block 500 is stored. Thus, block header 510 can store information surrounding the creation of the block and the location the data is being saved to. For example, block header 510 can include the virtual address associated with this data, the logical address associated with this data, the physical address associated with this data, the transaction identifier associated with this data, and/or other metadata. Block 500 can also store password wrapper 520. Password wrapper 520 can be configured to store a key for encrypting or decrypting data associated with a single user. If the proper passphrase (e.g., password) is provided, password wrapper 520 can be unlocked and the key can be accessed. The key can then be used to decrypt encrypted data on the disk that belongs to the user. By using a passphrase, the password wrapper allows a user to change a passphrase without changing the key for encryption and decryption. Therefore, data on the disk associated with the user may not need to be re-encrypted when the user changes his passphrase. In other examples, a single key can be used for encrypting or decrypting data on storage device 200. Thus, users of a storage device can share the same key for encrypting and decrypting data on the storage device. A user's passphrase would unlock a decryption key capable of decrypting all the content on the disk. Permission to files and data on a storage device can be controlled through permissions metadata on the files.

Block 500 can also store profile metadata 530. Profile metadata 530 can store metadata associated with a user profile. For example, profile metadata 530 can include an icon associated with the user, a screen name associated with the user, a user's handle or other metadata used to personalize or uniquely identify this user from other users in the system. In some examples, the metadata provides access to this block or other blocks on a storage device. In other examples, the metadata is related to attributes of the user. Access to profile metadata 530 can require a key that is retrievable from entering the proper passphrase. In other words, profile metadata 530 can be password protected.

Block 500 can also include pointers 540 for linking block 500 to other blocks on disks that contain data associated with the user. For example, the pointers can be configured to locate other blocks containing metadata associated with the user profile such as the user's address, the user's bank account information, user's shipping information, user's screen name, user's online account information and other information. If a user were to edit any of the information stored in a block pointed to by pointers 540, data block 500 can be rewritten to a new block so that pointers 540 of the data block would point to the updated user information.

Figure 6:
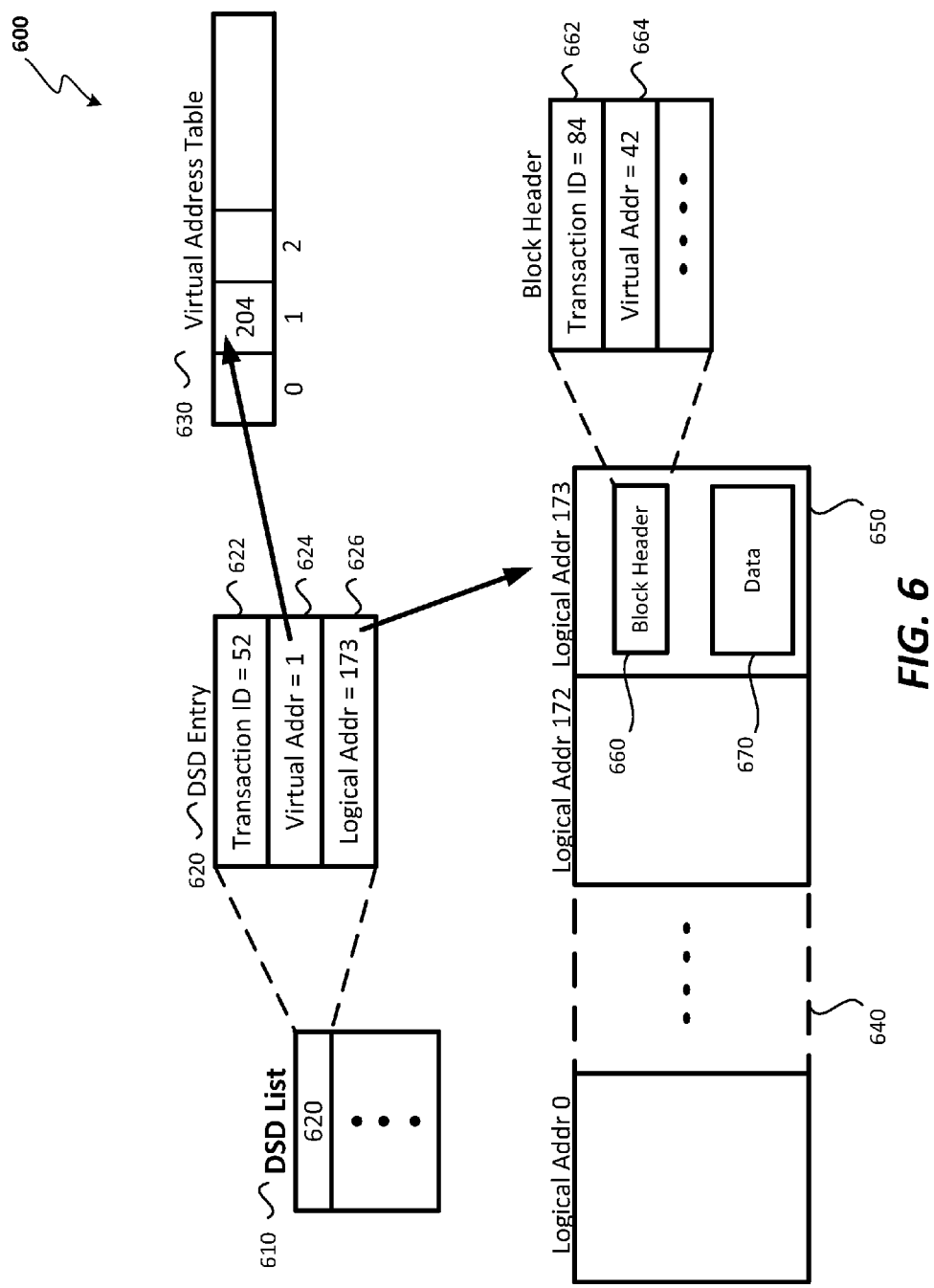
FIG. 6 illustrates an example of examining an entry in a delayed secure deletion list.

FIG. 6 illustrates an example of examining an entry in a DSD list. Each entry in a DSD list can be examined when a predetermined event has occurred. For example, the predetermined event can be when a user of the file management system has changed his password, deleted his account, or if any authentication or access rights of the files or users of the file management system have changed. This can occur after new authentication or access rights have been created, thus rendering the old versions/copies obsolete. The DSD list can be examined at this time so that blocks associated with DSD entries in the list are wiped of sensitive data.

In this example, a predetermined event has triggered file management system 600 to examine the DSD entries in DSD list 610. This can be part of an algorithm to clear sensitive data from blocks of the file management system. DSD list 610 includes entry 620. Entry 620 includes transaction ID 622 (with a value of '52'), virtual address 624 (with a value of '1'), and logical address 626 (with a value of '173'). In some examples, this means the block was generated from transaction '52' and the transaction resulted in a block being generated having a virtual address of '1' and a logical address of '173.' In other examples, transaction '52' means that the block was either rewritten or deleted in transaction '53.' File management system 600 can check virtual address table 630 for the logical address that is currently mapped to the virtual address with value '1'. The virtual address table 630 can map the virtual address to a logical address by using its mapping table. In other words, the virtual address table can provide the logical address of the block that stores the data associated with a given virtual address. Entry 620 can have been created as the associated block is being written or when a newer version is being written.

In some examples, the virtual address table can map virtual addresses to the logical address of the block storing the most up to date version (i.e., current version) of the data. The block storing the current version of the data is also known as a 'live block' or 'active block.' Both of these terms can be used interchangeably. In this example, virtual address table 630 maps the virtual address of value '1' to a logical address of value '204.' The file management system can compare the logical address stored in DSD entry 626 with the logical address mapped from virtual address table 630 by entering the virtual address '1' stored in DSD entry 626. This can be the process to determine if the block associated with DSD entry 620 is a live block. If the logical address value from virtual address table 630 is the same as the logical address stored in DSD entry 620, then the block associated with DSD entry 620 is a live block. In other words, a newer version has not been created since the writing of that block. On the other hand, if the logical address value is not the same, then the block associated with DSD entry 620 is not a live block (i.e., another block of the storage device stores a newer version of the data). Here, the logical addresses are not the same and thus, a determination is made that DSD entry 620 is not associated with a live block. As a result of this determination, the file management system can search disk 640 for the block associated with DSD entry 620 and delete (e.g., writing 0s or junk into the block) any sensitive data from the block. If the block has been reused or repurposed, no sensitive data will exist on the block and thus, no data will be deleted.

File management system performs a query on disk 640 for the block located at the value stored in logical address 626 (e.g., '173'), which returns block 650. Block 650 includes block header 660 and data 670. Data 670 can include the payload or contents of the block while block header 660 includes header information. As discussed above, block header 660 can contain information that provides context to the executed command, transaction, or action that resulted in the creation of block 650. In this example, block header 660 includes transaction ID 662 and virtual address 664. However, in other examples, only one of the values is stored in block header 660. In yet other examples, the block header can include the logical address of the block, the command that generated this block, or any other combination of information.

Once the file management system has located the block associated with DSD Entry 620, the block is checked to determine whether it contains sensitive data. Blocks that contain sensitive data can be wiped while blocks that do not contain sensitive data can be left alone. It is possible that blocks no longer contain sensitive data because blocks containing old versions of sensitive data may have been reused or repurposed by the file management system and therefore no longer contain sensitive data. In this example, the file management system can determine whether a block contains sensitive data by comparing the contents of block header 660 with DSD Entry 620. If one or more of the metadata stored in DSD Entry 620 does not match the metadata stored in the block header, then the block has been reused by the file management system and therefore does not need to be erased. For example, the file management system can compare the virtual address 624 with virtual address 664. Here, the two values are different, thus implying that block 650 has been reused since block 650 is now storing data associated with virtual address value '42' instead of data associated with virtual address value '1.' As another example, the file management system can compare the transaction identifier 622 with transaction identifier 662. Here, the two values are different, meaning that the contents of block 650 were generated from transaction '84' rather than transaction '52.' Since a larger transaction identifier value is now stored in block 650, the block has been reused after it was last written and thus does not need to be erased. In other examples, a comparison of one or more values stored in DSD entry 620 and block 650 can be the same, thus resulting in the file management system erasing the block. This can be accomplished by zeroing out the bits of the block or alternatively writing junk values into the block.

Figure 7:
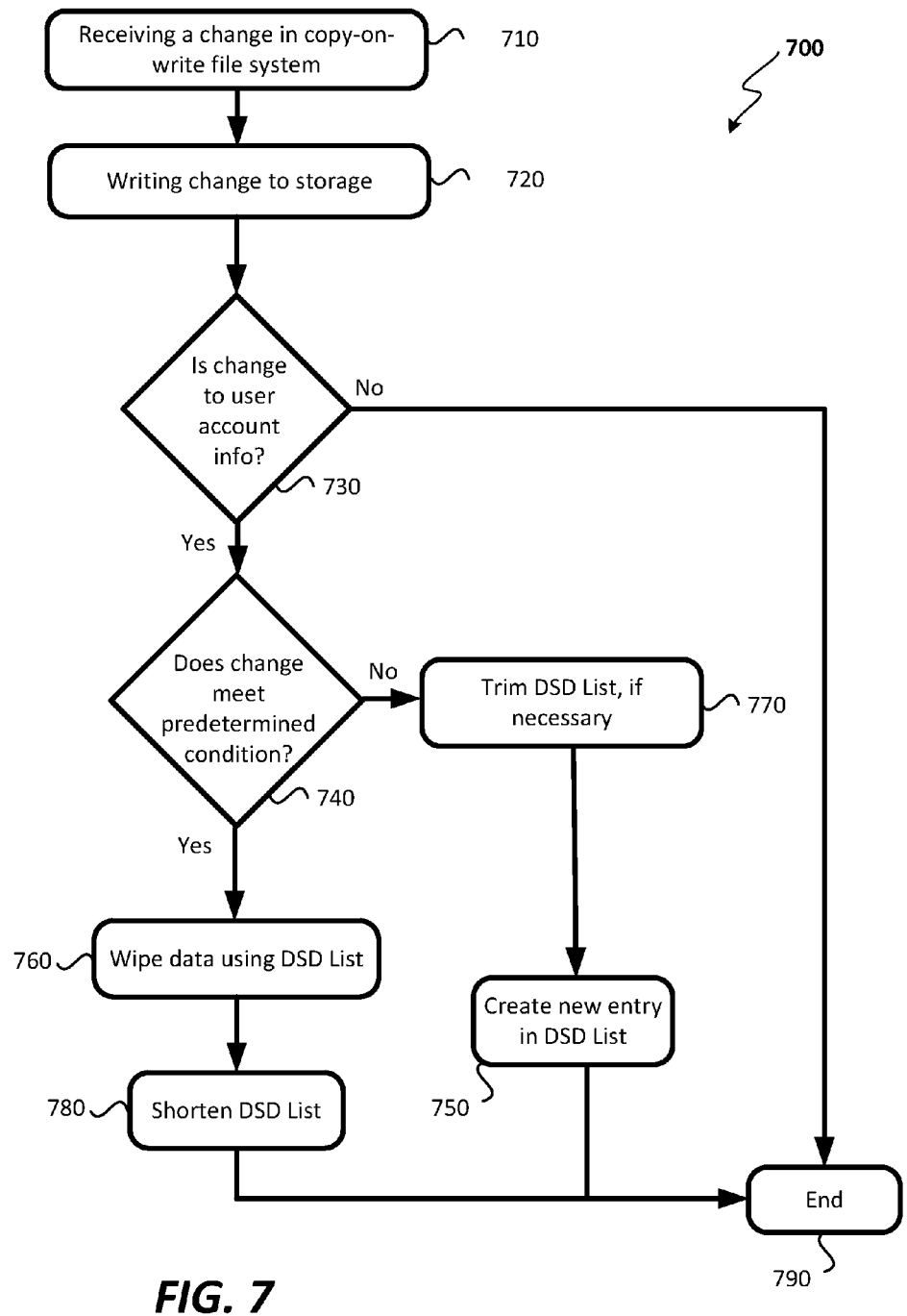
FIG. 7 illustrates an exemplary method for processing changes to a copy on write file system.

FIG. 7 illustrates an exemplary method for processing changes to a copy on write file system. Method 700 includes functionality such as managing a delayed secure deletion list, writing changes to the file system, and securely erasing sensitive data from the file system. These functions can be performed in the order shown or in a different order, depending on the application. In some examples, method 700 can be performed by the file management system. Method 700 can begin by receiving a change to a file stored on the file system (710). For example, the change can be a user changing his password, a user changing his icon image, or a change to other data associated with the user. The change results in the generation of a new version of the file. This new version, also known as an updated copy of the file, is written to storage (720). When writing the file to storage, the file can be written into one or more blocks of the storage. Depending on the algorithms applied by the file management system, one or more chained blocks can be assigned to store the file. For example, the file management system can select the block or blocks to use based on algorithms that take into consideration factors such as wear leveling. After the updated copy of the file is written to storage, a determination is made whether the change affected user account information (730). Changes to a user password, deleting a user account, or creating a new user account can affect user account information because the access rights to the accounts or the content have changed. Changes to a user icon or a user screen name can also affect user account information because it changes properties or metadata associated with the user (even though it does not affect the user access rights). Here, changes to user account information are monitored by the file management system to ensure that older versions of user account information are securely deleted whenever access rights to the content change. This can prevent attackers from accessing older versions of the user account information to gather decryption keys that would allow the attackers to decrypt the stored content. Thus, all changes to user account information, including ones that affect user access rights and ones that do not, are monitored by the file management system. In other examples, the determination of whether the change is to user account information does not need to be performed. For example, the determination does not need to be made if all files stored are related to user account information. Similarly, the determination does not need to be made if secure deletion is being performed for all files on the system.

If the change is to user account information, another determination is made whether the change meets a predetermined condition (740). In one example, the predetermined condition can be a change to sensitive data. Sensitive data can be data that would affect the access rights of the stored content. If the change is not to sensitive data, then the DSD list is trimmed, if necessary (770). This is to ensure that the DSD list does not extend to another block, which may waste disk space and slow down system performance. Afterwards, a new entry is created in the DSD list (750). The new entry in the DSD list can store metadata associated with the last block storing an older version of the file, where the metadata would allow the new entry to locate the location of the last block on the storage medium or device for deletion in the future. The metadata can include the virtual address, logical address, physical address, transaction identifier, executed command that led to creation of this entry, or other information. In other examples, the new entry in the DSD list can store metadata associated with the new block. Alternatively if the change is to sensitive data, the file management system can, by utilizing the DSD list, wipe one or more blocks that contain sensitive data (760). An example of this process is described in FIG. 8 below. After wiping the data, the DSD list is trimmed to a shorter length (780). Shortening the DSD list can include removing DSD entries pointing to blocks that have already been securely wiped. For example, the entries in the DSD list that are associated with blocks wiped in (760) can be removed from the DSD list. Various other algorithms can also be applied to remove entries from the DSD list based on the recovery window (e.g., removing DSD entries outside the recovery window or removing DSD entries pointing to blocks outside the recovery window). In yet other examples such as examples where a recovery window is not used, the entire DSD list can be wiped. Afterwards, method 700 ends (790). In other examples, one or more of the actions described above can be changed or performed in a different order.

Figure 8:
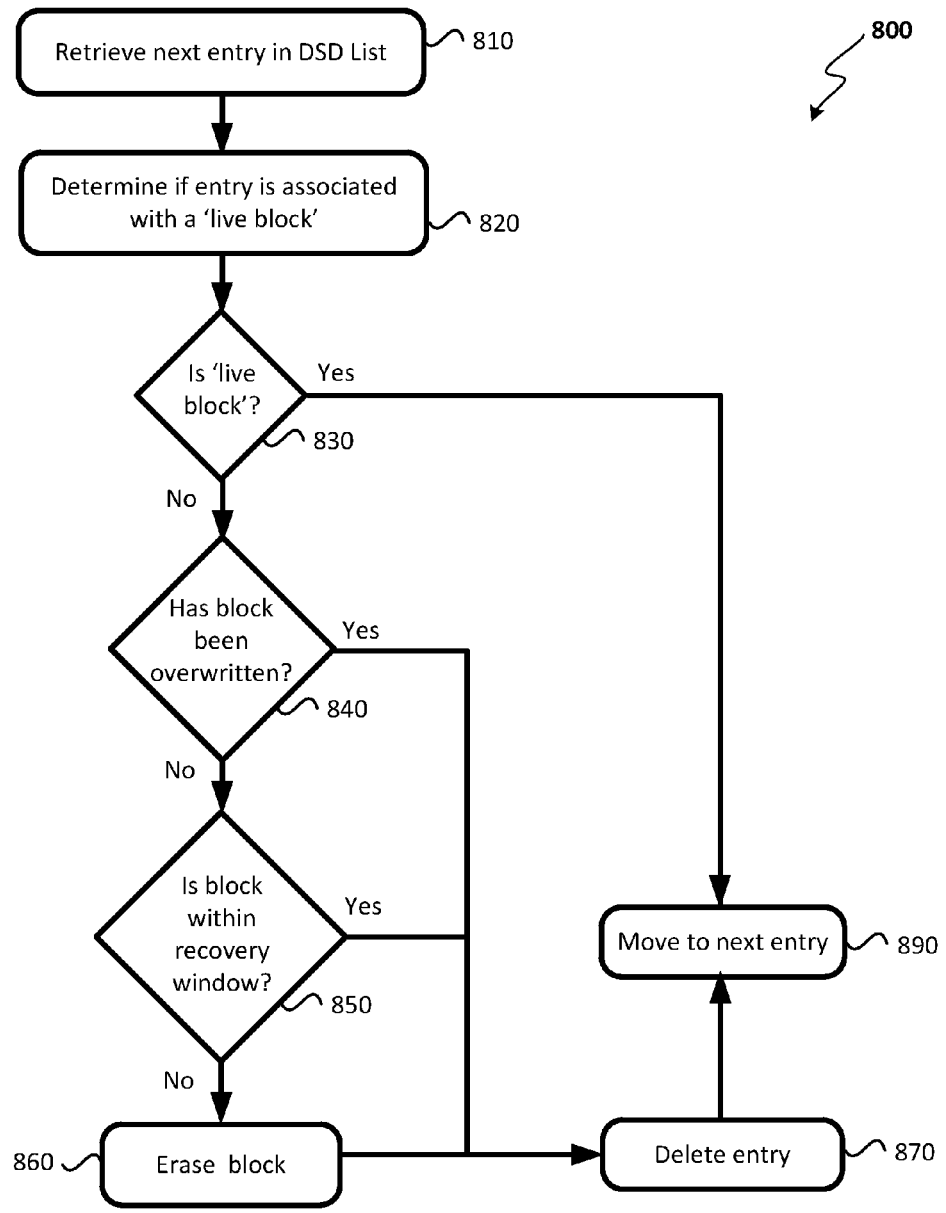
FIG. 8 illustrates an exemplary method for securely erasing data stored in blocks of a storage device by utilizing a delayed secure deletion list.

FIG. 8 illustrates an exemplary method for securely erasing data stored in blocks of a storage device by utilizing data stored in a delayed secure deletion list. Method 800, which illustrates actions performed by a file management system, can be configured to perform the actions described below. Method 800 can begin by retrieving the next entry in the DSD list (810). If this is the first time that the DSD list is iterated upon, this can be the first entry in the DSD list. Once the entry has been retrieved, a determination is made if the entry is associated with a 'live block' (820). A 'live block' stores the most up to date version of the data. In some examples, this determination can be made by using a virtual address table. The virtual address table can map a virtual address to the logical address of the block storing the current version of the data. In other words, the virtual address table can point the file management system to the current version of data. If the entry is associated with a 'live block' (830), then the entry is associated with a block storing a current file and as such, the entry is left in the DSD list and method 800 move onto the next entry (890). If the entry is not associated with a live block, then a determination is made if the block has been overwritten (840). In some examples, this determination can be made by comparing the block header information with the metadata stored in the entry. If the block header information is no longer the same as when previously written (or the block header contains metadata that is newer than the metadata stored in the entry), then the block has changed. Thus, the sensitive data has already been overwritten. In this scenario, the entry is deleted (870) and the next entry, if any, is retrieved (890). If however the block has not been already overwritten, then another determination is made whether the block is within the recovery window (850). A block within the recovery window cannot be deleted since the block is needed to support robust crash protection in cases of system failure. Therefore if the block is not within the recovery window, the block is not needed for crash protection and therefore can be erased (860). Erasing the block can include overwriting bits of the block with zero values or junk values. Once it is confirmed that the block does not contain secure data, the entry is deleted from DSD list (870) and the file management moves onto the next entry in the DSD list (890). On the other hand if the block is within the recovery window, the block is not erased, the entry is deleted (870) and the next entry, if any, is retrieved (890). In some examples, blocks within the recovery window can still be erased. This can be made possible by creating empty checkpoint transactions that shift the recovery window forward until all blocks that need to be erased are outside the recovery window. For example, multiple empty checkpoint transactions creating multiple copies of the same version of the data can create new entries in the DSD list until the desired block for deletion is outside the recovery window. In other examples, one or more of the actions described above can be changed or performed in a different order.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, solid state drives, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied other types of files to control the secure deletion of those files and other copies of those files from storage. Those skilled in the art will readily recognize various modifications and changes that may be made to the principles described herein without following the example embodiments and applications illustrated and described herein, and without departing from the spirit and scope of the disclosure.

We claim:

1. A storage system including a file system and a processor, the file system comprising:
    a plurality of blocks storing a set of files including a plurality of copies of a file, wherein the plurality of copies include different versions of the file;
    a delayed secure deletion list configured to store a plurality of entries, wherein each entry is associated with one of the plurality of copies of the file; and
    a mapping table configured to determine whether a particular copy of the file is the current version of the file;
    wherein the processor iterates through the plurality of entries to locate and delete one or more blocks storing the set of files based on the deletion list and the mapping table when a new version of a file not in the set of files is stored, wherein the new version of the file meets a predetermined condition.

2. The storage system of claim 1, wherein the deletion list is configured to be periodically trimmed to a size that is determined by a recovery window.

3. The storage system of claim 1, wherein each entry comprises a virtual address and the mapping table determines whether the particular copy of the file is the current version of the file based on the virtual address.

4. The storage system of claim 1, wherein the file contains data including a decryption key for decrypting the file system.

5. The storage system of claim 1, wherein the predetermined condition is a change in a user access rights of the file system.

6. The storage system of claim 1, wherein the predetermined condition is a change in a user password of the file system.

7. A method of erasing secure data in a file system, the method comprising:
    receiving a first change to a file in a set of files, the set of files including a plurality of copies of the file, the plurality of copies including different versions of the file, wherein the plurality of copies of the file are stored in a first set of blocks of a storage device;
    determining whether the change meets a predetermined condition;
    adding a set of entries into a delayed secure deletion list when the change meets the predetermined condition, the set of entries storing a set of addresses associated with the set of blocks; and
    deleting the set of blocks when a second change to a file not in the set of files is received, wherein the change triggers a predetermined event.

8. The method of claim 7, further comprising trimming the delayed secure deletion list based on a recovery window.

9. The method of claim 7, wherein the predetermined condition is a change to a user profile.

10. The method of claim 7, wherein the predetermined event is a change to a user password.

11. The method of claim 7, wherein the predetermined event is a change to user access rights.

12. The method of claim 7, wherein deleting the set of blocks comprises:
    retrieving the set of entries from the delayed secure deletion list;
    retrieving the set of blocks using the set of addresses stored in the set of entries;
    determining if blocks in the set of blocks have been overwritten; and
    erasing the blocks in the set of blocks based on the determination.

13. The method of claim 7, wherein deleting the first block comprises:
    retrieving the set of entries from the delayed secure deletion list;
    retrieving the set of blocks using the set of addresses stored in the set of entries;
    determining if blocks in the set of blocks are within a recovery window comprising a range of file versions that are not available for re-use for a period of time after being freed; and
    erasing the blocks in the set of blocks based on the determination.

14. A method, comprising:
    retrieving an entry from a delayed secure deletion list;
    locating a data block associated with the entry;
    first determining if the data block has been overwritten;
    second determining if the data block is within a recovery window comprising a range of file versions that are not available for re-use for a period of time after being freed;
    erasing the data block based on the first and second determination, wherein the data block is not erased if it is determined to have been overwritten, or determined to be within the recovery window; and
    deleting the entry from the delayed secure deletion list when the data block is not erased.

15. The method of claim 14, wherein locating a data block comprises comparing a logical address stored in the entry with a logical address retrieved from a mapping table.

16. The method of claim 15, wherein the mapping table maps a virtual address stored in the entry to the logical address.

17. The method of claim 14, wherein determining if the data block has been overwritten comprises comparing a logical address stored in the entry and another logical address stored in the data block.

18. The method of claim 14, wherein determining if the data block has been overwritten comprises comparing a transaction identifier stored in the entry and another transaction identifier stored in the data block.

19. The method of claim 14, wherein erasing the data block comprises storing a plurality of junk values in the data block.

20. The method of claim 14, further comprising deleting the entry from the delayed secure deletion list when the data block is erased.

21. A non-transitory computer readable storage medium storing instructions which, when executed by a computing device, cause the computing device to perform operations comprising:
    receiving a change to a file in a set of files, the set of files including a plurality of copies of the file, the plurality of copies including different versions of the file, wherein the plurality of copies of the file are stored in a first set of blocks of a storage device;
    determining whether the first change causes a security risk characterized by a predetermined condition including a change to a user profile, a change in a user access rights, or a change in a user password;
    adding a set of entries into a delayed secure deletion list when the change meets the predetermined condition, the set of entries storing a set of addresses associated with the set of blocks; and
    deleting the set of blocks when a second change to a file not in the set of files is received, wherein the second change triggers a predetermined event.

22. The non-transitory computer readable storage medium of claim 21, wherein deleting the first block comprises:

retrieving the set of entries from the delayed secure deletion list;
retrieving the set of blocks using the set of addresses stored in the set of entries;
first determining if blocks in the set of blocks have been overwritten;
second determining if blocks in the set of blocks are within a recovery window comprising a range of file versions that are not available for re-use for a period of time after being freed; and
erasing blocks in the set of blocks based on the first and second determination.

* * * * *